United States Patent
Mashikian et al.

[15] 3,673,305
[45] June 27, 1972

[54] CAPACITIVELY GRADED MODULAR POTHEAD FOR H-V CABLE

[72] Inventors: Matthew S. Mashikian, Huntington Woods; James K. Kelley, Carleton; William C. McMurray, St. Clair Shore, all of Mich.

[73] Assignee: The Detroit Edison Company, Detroit, Mich.

[22] Filed: Nov. 4, 1970

[21] Appl. No.: 86,709

[52] U.S. Cl. ........................174/12 BH, 174/19, 174/73 R, 174/143, 317/247, 317/261
[51] Int. Cl. .....................................H02g 15/02, H02g 15/22
[58] Field of Search..................174/12 BH, 19, 73 R, 73 SC, 174/75 D, 75 F, 80, 143; 317/247, 261

[56] References Cited

UNITED STATES PATENTS

| | | | |
|---|---|---|---|
| 1,868,962 | 7/1932 | Atkinson | 174/73 R |
| 3,290,428 | 12/1966 | Yonkers | 174/73 R |
| 3,355,541 | 11/1967 | Hornberger | 174/73 R |
| 3,479,443 | 11/1969 | Mashikian et al. | 174/73 R |

FOREIGN PATENTS OR APPLICATIONS

| | | | |
|---|---|---|---|
| 26,794 | 1/1964 | Germany | 174/73 R |
| 20,836 | 6/1966 | Japan | 174/143 |

*Primary Examiner*—Laramie E. Askin
*Attorney*—Whittemore, Hulbert & Belknap

[57] ABSTRACT

Improved electrical insulating devices, preferably modular, including series connected capacitances provided by flat contacting alternated insulating and conducting elements. The insulating material between conducting elements is a resin including ceramic filler providing desirable variations in dielectric constant. The end capacitance forming elements of each module are of metal and are provided with fastening means for interconnecting the modules.

24 Claims, 9 Drawing Figures

Patented June 27, 1972
3,673,305
3 Sheets-Sheet 1
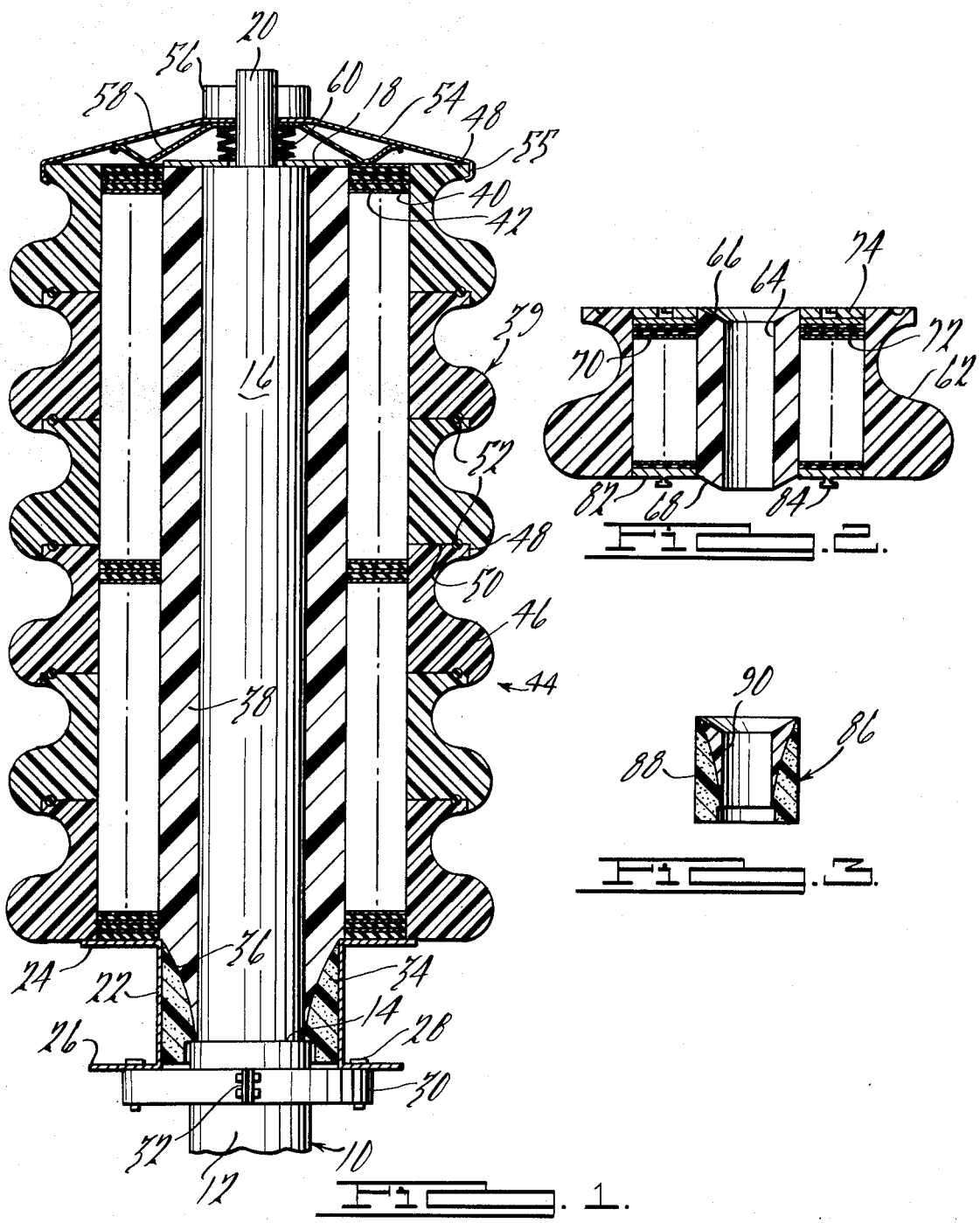
INVENTORS.
Matthew S. Mashikian,
James H. Kelley,
William C. McMurray
BY
Whittemore Hulbert
& Belknap
ATTORNEYS

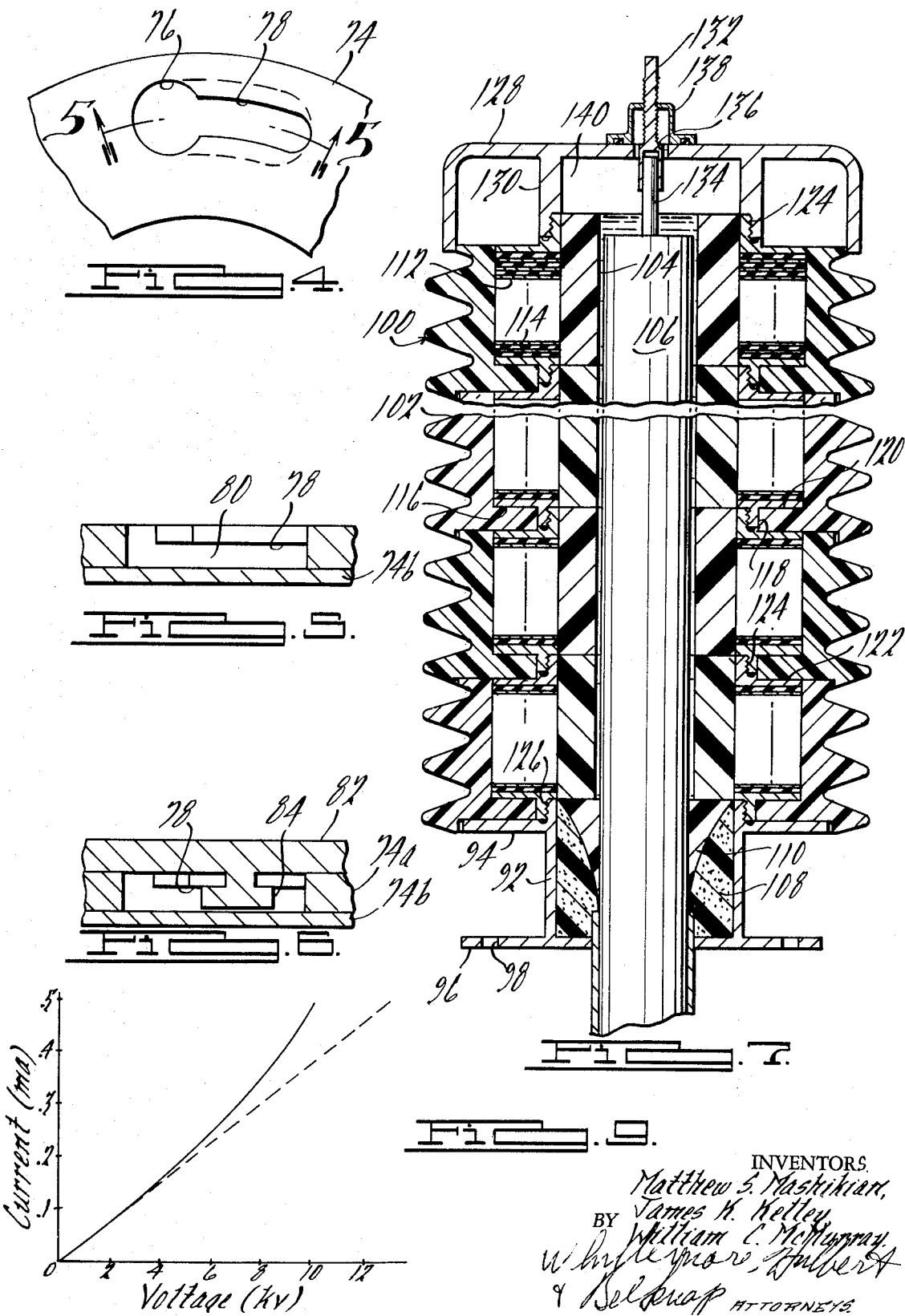

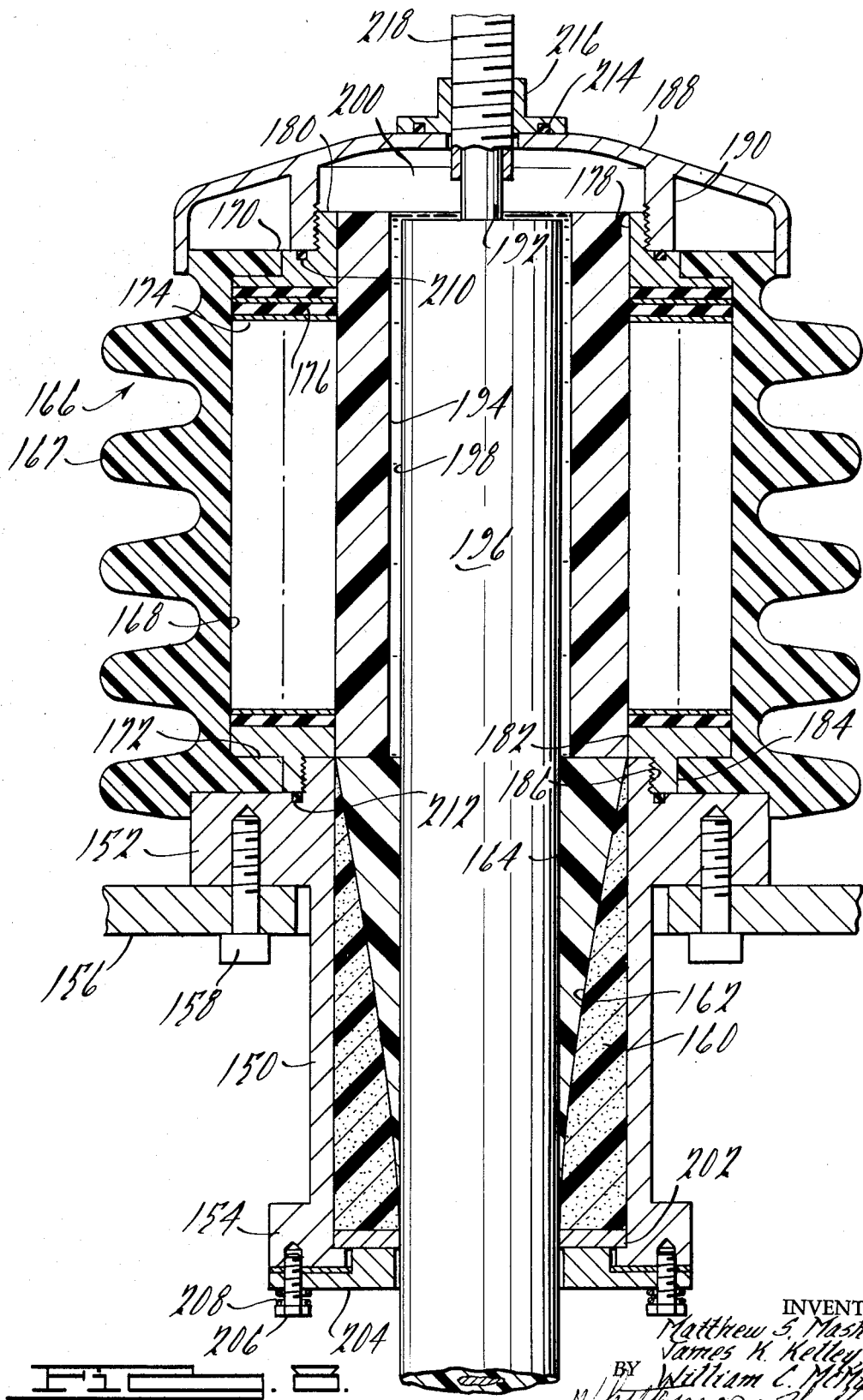

CAPACITIVELY GRADED MODULAR POTHEAD FOR H-V CABLE

CROSS-REFERENCE TO RELATED INVENTION

The present invention represents an improvement over our prior U.S. Pat. No. 3,479,443, granted Nov. 18, 1969.

BRIEF SUMMARY OF THE INVENTION

The present invention relates to a pothead or a construction provided at the end of an insulated high voltage cable to establish a field which varies substantially uniformly from ground potential at the cable sheath to the line potential at the end of the pothead. Field potential is caused to reduce gradually in a manner approaching a linear diminution of strength per unit of length by employing a multiplicity of capacitances constituted by alternated rings of electrically conducting and electrically insulating material. The series of rings may be divided into groups assembled within an outer insulating sheath which are adapted to be connected together in a modular fashion to produce a pothead of a length determined by service conditions.

Means are provided for interconnecting adjacent modules which comprises metal rings constituting end elements of the series of capacitances provided with interengaging bayonet type slots to provide mechanical connection between modules while preventing arcing between modules.

The present construction includes the provision of a resin impregnated with carbon to give it measurable conductivity shaped to function as a stress cone in the assembly.

BRIEF DESCRIPTION OF THE DRAWINGS

FIG. 1 is a longitudinal sectional view of a pothead constructed in accordance with the present invention.

FIG. 2 is a sectional view of a module which may be used to produce an assembly equivalent to that shown in FIG. 1.

FIG. 3 is a sectional view of a flexible shield for use in conjunction with an end module as shown in FIG. 2.

FIG. 4 is an enlarged fragmentary elevational view of a connector slot at one end of a module.

FIG. 5 is a sectional view on the line 5—5, FIG. 4.

FIG. 6 is a sectional view showing the inter-engagement between connector elements at opposite ends of adjacent modules.

FIG. 7 is an elevational view of a modified module construction.

FIG. 8 is a sectional view through yet another embodiment of the present invention.

FIG. 9 is a graph showing the non-linear current-voltage characteristics of the dielectric material in the capacitances.

DETAILED DESCRIPTION

Referring first to FIG. 1 there is shown a pothead for attachment to a high voltage cable a portion of which is indicated at 10, having a metallic conducting shield 12 illustrated in the Figure as stripped back to terminate at 14. The insulation of the cable, as indicated at 16, extends generally through the pothead and terminates at the upper end where it is engaged by a washer 18. The metallic conductor of the cable is indicated at 20.

The pothead itself comprises a generally cylindrical metal shield 22 having radially extending flanges 24 and 26. Secured to the bottom flange 26 by threaded fastening elements 28 is a bottom clamp 30 having clamping ears indicated at 32 by means of which the clamp may be caused to engage tightly against the outer metallic shield 12 of the cable.

Adjacent the lower end of the pothead there is provided a flexible shield 34 which is formed of a suitable polymeric material such for example as polyurethane but provided with a small amount of conducting particles such as carbon to produce measurable conductivity. The shield is shaped as shown to have a generally tapered inner surface 36, herein illustrated as convex, which joins the correspondingly shaped bottom end of a flexible insulating sleeve 38. The shield 34 and the portion of the flexible sleeve 38 within the metal shield 22 constitutes an electrical stress relief assembly. The flexible insulating sleeve 38 may be formed of the same material, such as polyurethane, except that it does not contain conducting particles. Shield 34 and sleeve 38 are chemically bonded together.

As seen in FIG. 1, the inner surface of the sleeve 38 engages the outer surface of the insulation 16 provided on the high voltage cable.

Surrounding the flexible insulating sleeve 38 is a construction 39 comprising a multiplicity of modules each comprising series connected capacitances formed by conducting rings 40 separated by electrically insulating rings 42 formed of a material having a high mechanical strength and a high dielectric constant. Preferred materials for this purpose suitable for use in all of the embodiments of the invention illustrated herein, will be subsequently described in detail.

Surrounding the cylindrical array of alternated metallic rings 40 and insulating rings 42 of each module is an outer insulator ring 46. Rings 46 are molded or otherwise permanently secured around the in-built capacitors and each are provided adjacent their upper ends with portions 48 adapted to seat within correspondingly shaped recesses 50 provided at the underside of the next adjacent ring. Sealing means such for example as 0-rings 52 are provided. The rings may be mechanically connected by suitable means such as the bayonet joint construction shown in detail in FIGS. 2 and 4–6.

At the top of the pothead there is provided an end cap or cover 54 having an outer peripheral flange 55 bent to embrace the top portion 48 of the uppermost insulating ring 46. The cover 54 is retained in place by suitable means such for example as a clamp 56 engaged with the bared conductor portion 20 of the cable. Within the cover 54 is provided a spring conductor 58 engaging the uppermost metal ring 40 and adapted to electrically connect the upper metal ring 40 with the end cap 54. Also, intermediate the washer 18 and the underside of the spring 58 is an additional spring 60 which limits vertical movement of the insulating sleeve 38.

The rings 46 which constitute the outer insulating body 44, are formed of a suitable arc and track resistant, high heat resistant, weather resistant, insulating polymeric material, such for example as cyclo-aliphatic epoxy resin plus hardener system together with fillers and additives.

The series connected condensers or capacitors comprising the rings 40 and 42, may of course be precast into an integral construction by injecting the insulating material in the form of an insulating resin in fluid condition between the metal rings or by alternating the metallic rings with the resin and subjecting the assembly to pressure to effect a bond between the metal and insulating rings.

Instead of providing a continuous flexible insulating sleeve, the construction best illustrated in FIGS. 2–6 may be employed. Here, each of the outer insulating rings is designated 62 and each contains a section of the inner flexible sleeve here designated 64, the upper end of which is concave as indicated at 66 to receive the lower convexly tapered end portion 68 of the next adjacent module. The module illustrated in FIG. 2 is provided intermediate the flexible sleeve 64 and the outer conducting ring 62 with a series of alternated series connected condensers formed by alternated metal rings 70 and insulating rings 72. The upper ring of the series is indicated at 74 and is provided with a slot construction best illustrated in FIGS. 4 and 5, comprising a keyhole shaped opening 76 including an inwardly extending flange 78 defining therebeneath a space 80 into which interlock structure on the next adjacent module may enter. The lowermost metal ring, designated 82, has a construction best illustrated in FIG. 6, comprising downwardly extending headed pins 84. The heads of the pins are adapted to pass through the enlarged circular portion of the keyhole opening 70 and upon relative rotation between the parts, to move into position underlying the flange 78 as best illustrated in FIG. 6. With this arrangement there is not only provided a positive and rigid mechanical interconnection between the modules, but also the means interconnecting the modules provides an electrostatic shield around the locking pins which prevents electrical discharge under high voltage conditions.

Since the female bayonet slot connection illustrated in detail in FIGS. 4–6 cannot be machined in a single disc, the upper ring 74 is formed of two discs designated 74a and 74b. Thus, the space in which the headed pins 84 are received is a fully enclosed space completely surrounded by metal and constituting a Faraday cage. As best illustrated in FIG. 6, it will be noted that the bottom ring 82 is in surface contact with the upper ring 74a which in turn is in surface contact with the closure ring 74b.

The construction resulting from the assembly of a multiplicity of the modules illustrated in FIG. 2 includes a short section of flexible shield 86 including the properly shaped shield section 88 formed of a flexible polymeric material such for example as polyurethane including particles of conducting material, and the cooperating flexible sleeve portion 90 which cooperates with the shield portions 64 of the assembly. It will of course be understood that the flexible shield 86 is included within a metallic shield such as that illustrated in FIG. 1, and that the upper flange 24 of the shield 22 in such case, will be provided with keyhole slots adapted to be associated with the headed pins 84 to secure the lowermost module to the metallic shield 22.

Referring now to FIG. 7 there is illustrated a somewhat different embodiment of the invention. In this case the bottom metallic shield is illustrated at 92 and is provided with outwardly extending flanges 94 and 96, the bottom flange being apertured as indicated at 98 for connection to a cable clamp such as indicated at 30 in FIG. 1. The construction illustrated in FIG. 7 is fully modular and the modules indicated generally at 100 each comprise an outer insulating ring 102 having the outer surface shaped to provide the smoothly curved flanges as illustrated. Each module comprises an inner insulating sleeve section 104 which may engage the outer surface of the insulation 106 formed on the high voltage cable. Alternatively, the inner surface of the sleeve sections may be spaced laterally from the insulating cover on the cable to provide space in which oil may be received. In any case the flexible insulating shield provided within the metal shield 92 is shaped to closely engage and provide a sealing connection with the insulation 106 on the cable. In this case the flexible insulating shield again comprises a shaped portion 108 containing conducting particles and adapted to define a stress cone, and an inner portion 110 which may also be formed of the same flexible insulating material as the portion 108 but not including the conducting particles.

Surrounding the sections 104 of the flexible sleeve are the series of condensers comprising the metallic rings 112 alternated with the insulating rings 114. These are provided in each module. The metallic ring 116 at the bottom of each module includes a downwardly extending internally threaded collar 118. This ring rests upon an inwardly extending flange 120 forming a part of the insulating rings 100. The uppermost metal ring in each module, designated at 122, includes an upwardly extending externally threaded collar 124 adapted to be threaded into the downwardly extending collar 118 of the next adjacent module. The metal shield 92 includes an upwardly extending externally threaded collar 126 adapted to be threadedly engaged by the downwardly extending internally threaded collar on the lowermost module.

A metal cap or cover 128 is provided having a downwardly extending internally threaded collar 130 adapted to be threaded to the upwardly extending externally threaded collar 124 on the uppermost module.

A threaded terminal sleeve 132 is attached to the bared conductor 134 of the H-V cable by crimping, soldering, or the like. The terminal sleeve extends through an opening 136 provided in the cap 128 and is engaged by a top lock member 138 which contains an expanding bellows and moisture seal to permit expansion of oil provided in the unit.

The insulating sleeve sections 104 may be omitted and the space between the cable insulation 106 and the inner surface defined by the alternated conducting and insulating rings 112, 114, 120 and 122, may be filled with oil which may expand into the space designated at 140 in the cap 128.

Referring now to FIG. 8 there is illustrated a modified embodiment of the invention in which the generally annular metallic shield 150 has radial flanges 152 and 154. The construction is shown as mounted on support structure 156 by fastening screws 158. Located within the metal shield 150 is a flexible shield 160 having its inner surface tapered as indicated at 162 and engaged by the correspondingly shaped outer surface of a short flexible insulating shield 164. Again, the shield 160 includes conducting particles to give it measurable conductivity and the shields 160 and 164 serve as an electrical stress relief assembly. It may be mentioned at this time that the flexible insulating shields illustrated at 34, 108, 88 and 160 herein, may be formed of resilient polymeric material such as flexible polyurethane or silicone rubber formulated to have a resistivity on the order of $10^4$ Ohms Cm.

The pothead comprises an outer tubular insulator 166 having annular outwardly extending curved ribs or flanges 167 and an inner cylindrical surface 168. At its upper end the insulating ring 166 has a radially inwardly extending flange 170 and a similar inwardly extending flange 172 is provided adjacent its lower end. Intermediate the flanges 170 and 172 is a condenser array provided by alternated conducting rings 174 and insulating rings 176. At the top of the condenser assembly is a metallic ring 178 having an upwardly extending externally threaded flange 180. At the bottom of the condenser assembly is a metallic ring 182 provided with a downwardly extending internally threaded flange 184. The metal shield 150 is provided with an upwardly extending externally threaded flange 186 which is threadedly engaged with the flange 184. At the top of the pothead there is provided a cap 188 having a downwardly extending internally threaded flange 190 which engages the flange 180 and also constitutes an electrical connection between the bared electrical cable 192 and the uppermost ring 178 of the array of series connected condensers.

Within the condenser assembly constituted by the rings 174 and 176 is an insulating sleeve 194 the inner surface of which is spaced from the outer surface of the insulation 196 provided on the high voltage cable defining the space indicated at 198 therebetween for the reception of oil which may extend upwardly into the space 200 provided in the cap 188. It will be observed that the flexible insulating sleeve section 164 closely and sealingly engages the external surface of the insulation 196 provided on the cable, and to insure tight sealing contact a washer 202 is provided which engages the lower end of the flexible insulating shield 160. Continuous pressure is applied to this washer by means of a ring 204 secured to the underside of the metallic shield 150 by screws 206 provided with compression spring 208 extending between the heads of the screws and the lower surface of the washer 204.

In addition, O-ring seals are indicated at 210 and 212. Also, O-rings indicated at 214 are provided between a threaded sealing nut 216 engaging a threaded connector 218 which in turn sealingly engages the upper end of the bared cable conductor 192.

While only a single module is shown in FIG. 8, it is obvious that for higher voltage applications, a multiplicity of such modules could be assembled, with threaded flanges 180, 184 screwed together.

The materials used in making the insulating flat rings which alternate with the conducting flat rings, include combinations of plastic resins and fillers. The resin may be a thermosetting or thermoplastic type selected from the group consisting of epoxy, polyester, silicone, polysulfide, polyurethanes, and combinations thereof; also, polyolefin and ABS (acrylonitrile butadiene styrene). The fillers are ceramics and can be barium, bismuth, lead or strontium compounds in the form of niobates, silicates, tantalates or zirconates, or oxides of lanthanum and titanium.

A combination of the resins and the fillers produces a dielectric matrix with high dielectric constant which displays desirable properties.

The current produced in a layer of this matrix by a voltage impressed across the layer varies in a nonlinear fashion with respect to this voltage as illustrated in FIG. 9. This nonlinearity has a desirable effect as it tends to limit the voltage across any portion of the pothead which is subjected to a large leakage current. In FIG. 9, the nonlinearity reduces the voltage from 13 Kv (linear portion) to 10 Kv for a leakage current of 0.5 ma.

In addition, the dielectric constant of the matrix increases with temperature. For instance, experimental measurements have shown that the dielectric constant at 80° C. was approximately double that at 25° C. Thus, if a portion of pothead is overheated (due, for instance, to a localized high voltage gradient), the capacitance of that portion will automatically increase and this will cause a lesser share of the voltage to be assumed by the heated portion. The voltage gradient is, therefore, automatically controlled.

We claim:

1. A capacitively graded electrically insulating device comprising an elongated tubular flexible insulating resin sleeve and including a shaped portion at one end formed of the same resin as the balance of the sleeve and chemically bonded thereto and having electrically conducting particles therein to provide measurable conductivity and constituting an electrical stress relief assembly, a series of alternated contacting flat conducting and insulating rings surrounding said sleeve and constituting a multiplicity of series connected capacitors, a tubular outer insulator surrounding said rings, a H-V cable having a grounded sheath, insulation within said sheath, and a conductor within said insulation, said cable having an end portion with the sheath removed extending through said sleeve and having its conductor bared beyond the end of said sleeve, means electrically connecting said sheath to a conducting ring at one end of said series of rings and means electrically connecting said bared conductor to a conducting ring at the other end of said series of rings.

2. A device as defined in claim 1 in which the outer insulator and the in-built series connected capacitors are formed of a plurality of like modules.

3. A device as defined in claim 1 in which the shaped end portion of said sleeve has a cylindrical outer surface, and a metal sleeve in which said end portion is received.

4. A device as defined in claim 3, the shaped end portion of said insulating sleeve being tightly embraced in said metal sleeve in sealing relation.

5. A capacitively graded electrically insulating device comprising a tubular outer insulator through which the end of a H-V cable extends with its ground sheath stripped away throughout said device and its insulation continuous except for the end of the cable at the end of the device where the conductor is bared, a series of flat alternated contacting insulating and conducting rings within said insulator, and spaced radially outwardly from the cable portion therewithin, the end rings of said series being metal rings, a hollow cap closing the outer end of said device, the space within said cap serving as an expansion chamber for oil in the space between the H-V cable and said series of rings, means electrically connecting the metal ring at the outer end of said series to the bared conductor end, an insulating seal surrounding the cable at the inner end of said device and sealingly engaging the exposed cable insulator thereat, a metal sleeve supporting the inner end of said outer insulator, surrounding said insulating seal and electrically connecting the adjacent conducting end ring of said series to the end of the ground sheath on the H-V cable.

6. A device as defined in claim 5 in which the portion of said insulating seal within said metal sleeve comprises a shaped measurably conducting end portion cooperating with the adjacent structure to form an electrical stress relief assembly.

7. A device as defined in claim 5, which comprises an insulating sleeve having its internal diameter dimensioned to be spaced radially outwardly from the insulation on said cable to provide a space for the reception of oil therebetween.

8. A module for assembly with a plurality of like modules to form a capacitively graded electrically insulating device, each module comprising a series of flat alternated insulating and conducting rings in end contact with each other constituting a multiplicity of series connected capacitances, an outer annular insulating body formed of arc and track resistant resin permanently secured around said series of alternated insulating and conducting rings and surrounding said series from end to end, the outer surface of said body being shaped to form with like modules an outer surface of smoothly curved axially spaced circular ribs, the rings at the ends of each module being metal rings having mechanical connecting means integral therewith effective to hold the adjacent modules in firm mechanical and electrical contact with each other.

9. A module as defined in claim 8 in which the connecting means comprises bayonet joints.

10. A module as defined in claim 9 in which the bayonet joints comprise a pair of metal plates having flat surfaces in inter-engagement and connected together, one of said plates being apertured and grooved on the side thereof in engagement with the other of said plates to form a completely enclosed Faraday cage for the reception of a headed pin constituting the other part of the bayonet joint.

11. A module as defined in claim 8 in which the mechanical connecting means at one end of each module comprises an annular flange at the inner edge of the ring on which it is provided and having its inner surface forming a smooth continuation of the inner surface of said ring and having its outer surface threaded, the mechanical connecting means at the other end of each module comprising an internally threaded flange spaced outwardly from the inner edge of the ring on which it is provided by the effective thickness of the flange at the other end of said module, and dimensioned such that an assembly of such modules forms an outer insulator assembly having a smooth continuous uninterrupted surface confronting the H-V cable therein.

12. A module as defined in claim 11 in which said flanges are spaced from the outer edges of said ring to form when assembled together an outwardly open cylindrical recess, the outer annular insulating body of each module having an inwardly extending annular flange received in said recess in assembly.

13. A module as defined in claim 12 in which one of the end rings of each module is provided with a circular channel located outwardly of the threaded flange thereon, an O-ring in said channel, said O-ring being dimensioned to provide an effective seal while permitting engagement between the end surface of outwardly threaded flange and the adjacent surface of the end ring of the adjacent module.

14. A capacitively graded electrically insulating device comprising an elongated series of end-contacting alternated flat insulating and conducting rings constituting a series connected group of capacitances, an insulating sleeve within said capacitances, a generally tubular insulating body surrounding said capacitances, said insulating rings being formed of a plastic resin material provided with a ceramic filler selected to produce a high dielectric constant the value of which increases with temperature.

15. A capacitively graded device as defined in claim 14 in which the dielectric material has a non-linear relationship between impressed voltage and resulting current which upon increase in voltage produces a current greater than the current value which would be produced if the current-voltage characteristic was linear.

16. A device as defined in claim 14 in which said device is formed of a multiplicity of end connected modules, each of which comprises a multiplicity of said rings, an insulating sleeve with said rings, and an outer tubular insulating body surrounding said rings.

17. A device as defined in claim 16 in which the rings at the ends of each module have mechanical connection means formed integral therewith.

18. A device as defined in claim 14 in which the plastic of which said rings are formed is selected from the group consisting of epoxy, polyester, silicone, polysulfide, urethane, and combinations thereof; and polyolefin and ABS (Acrylonitrile butadiene styrene).

19. A device as defined in claim 14 in which said ceramic filler is selected from the group consisting of niobates, silicates, tantalates and zirconates of barium, bismuth, lead and strontium, and oxides of lanthanum and titanium.

20. A capacitively graded electrically insulating device comprising an elongated end-contacting series of alternated insulating and conducting rings constituting a series connected group of capacitances, an insulating sleeve within said capacitances, a generally tubular insulating body surrounding said capacitances, said insulating rings being formed of a plastic resin material provided with a ceramic filler selected to produce a high dielectric constant and having a non-linear relationship between impressed voltage and resulting current which upon increase in voltage produces a current greater than the current value which would be produced if the current-voltage characteristic was linear.

21. A capacitively graded electrically insulating device comprising an elongated tubular flexible insulating resin sleeve and including a shaped portion at one end having electrically conducting particles therein to provide measurable conductivity and constituting an electrical stress relief assembly, a series of alternated contacting flat conducting and insulating rings surrounding said sleeve and constituting a multiplicity of series connected condensers, a tubular outer insulator surrounding said rings, a H-V cable having a grounded sheath, insulation within said sheath, and a conductor within said insulation, said cable having an end portion with the sheath removed extending through said sleeve and having its conductor bared beyond the end of said sleeve, means electrically connecting said sheath to a conducting ring at one end of said series of rings and means electrically connecting said bared conductor to a conducting ring at the other end of said series, the insulating rings alternated with said conducting rings being formed of plastic having ceramic type filler selected from the group consisting of niobates, silicates, tantalates and zirconates of barium, bismuth, lead and strontium, and oxides of lanthanum and titanium.

22. A device as defined in claim 21 in which the plastic of which said rings are formed is selected from the group consisting of epoxy, polyester, silicone, polysulfide, urethane, and combinations thereof; and polyolefin and ABS (Acrylonitrile butadiene styrene).

23. A capacitively graded electrical insulating device comprising an elongated series of end-contacting flat alternated insulating and conducting elements constituting a series connected group of capacitances, a generally tubular insulating body surrounding said capacitances, said insulating elements being formed of a plastic resin material provided with a ceramic filler selected to produce a high dielectric constant the value of which increases with temperature.

24. A device as defined in claim 23 in which the insulating material of the insulating elements has a non-linear relationship between impressed voltage and resulting current which upon increase in voltage produces a current greater than the current value which would be produced if the current-voltage characteristic was linear.

* * * * *